United States Patent
Kramer et al.

(10) Patent No.: US 9,512,803 B2
(45) Date of Patent: Dec. 6, 2016

(54) INJECTION TIMING

(71) Applicant: Ford Global Technologies, LLC, Dearborn, MI (US)

(72) Inventors: Ulrich Kramer, Bergisch Gladbach (DE); Rolf Klein, Ruppichteroth (DE); Klemens Grieser, Langenfeld (DE)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 13/954,591

(22) Filed: Jul. 30, 2013

(65) Prior Publication Data
US 2014/0048045 A1 Feb. 20, 2014

(30) Foreign Application Priority Data
Aug. 17, 2012 (DE) .................. 10 2012 214 676

(51) Int. Cl.
*F02D 41/34* (2006.01)
*F02D 13/02* (2006.01)
*F02D 19/08* (2006.01)
*F02D 41/00* (2006.01)
*F02D 41/14* (2006.01)
*F02D 41/18* (2006.01)

(52) U.S. Cl.
CPC ......... *F02D 41/345* (2013.01); *F02D 13/0234* (2013.01); *F02D 19/084* (2013.01); *F02D 41/0027* (2013.01); *F02D 41/0065* (2013.01); *F02D 41/1454* (2013.01); *F02D 41/18* (2013.01); *F02D 2041/001* (2013.01); *F02D 2200/0406* (2013.01); *F02D 2200/0414* (2013.01); *F02D 2200/0418* (2013.01); *F02D 2200/101* (2013.01); *F02D 2250/31* (2013.01); *Y02T 10/18* (2013.01); *Y02T 10/36* (2013.01); *Y02T 10/44* (2013.01)

(58) Field of Classification Search
CPC .... F02D 41/34; F02D 41/345; F02D 13/0234; F02D 19/084; F02D 41/0027
See application file for complete search history.

(56) References Cited

U.S. PATENT DOCUMENTS 5,230,320 A 7/1993 Hitomi et al.
8,725,390 B1 * 5/2014 Snyder et al. ............... 701/105
(Continued)

OTHER PUBLICATIONS

Obiols, Jerome et al., "Potential of Concomitant Injection of CNG and Gasoline on a 1.6L Gasoline Direct Injection Turbocharged Engine," JSAE Technical Paper Series No. 20119171, Society of Automotive Engineers of Japan, Inc, 2011, 16 pages.

*Primary Examiner* — Jacob Amick
(74) *Attorney, Agent, or Firm* — Julia Voutyras; Alleman Hal McCoy Russell & Tuttle LLP

(57) ABSTRACT

Various systems and methods for determining a start of fuel injection including a gaseous fuel in an internal combustion engine are provided. In one embodiment, an end of gas injection, a duration of gas injection, and a start of gas injection in an induction pipe of a cylinder of an internal combustion engine is determined based on one or more operating parameters. An earliest possible start of gas injection is further determined, and if the start of gas injection is before the earliest possible start of gas injection, at least one of the one or more operating parameters is modified such that the start of gas injection does not occur before the earliest possible start of gas injection.

18 Claims, 3 Drawing Sheets

(56) References Cited

U.S. PATENT DOCUMENTS

| | | |
|---|---|---|
| 2001/0045194 A1* | 11/2001 | Shiraishi et al. .......... 123/90.15 |
| 2007/0056536 A1 | 3/2007 | Lanteires |
| 2007/0056560 A1 | 3/2007 | Trask et al. |
| 2008/0208438 A1* | 8/2008 | Sukegawa ............. F02D 41/047 |
| | | 701/105 |
| 2011/0132330 A1* | 6/2011 | Pursifull ....................... 123/478 |
| 2011/0208405 A1* | 8/2011 | Tripathi et al. ............... 701/102 |

* cited by examiner

INJECTION TIMING

CROSS REFERENCE TO RELATED APPLICATIONS

The present application claims priority to German Patent Application No. 102012214676.8, filed on Aug. 17, 2012, the entire contents of which are hereby incorporated by reference for all purposes.

FIELD

The disclosure relates to the determination of fuel injection timing in an internal combustion engine.

BACKGROUND AND SUMMARY

In a flexible-fuel vehicle, an internal combustion engine may be operated with more than one fuel type. For example, such an internal combustion engine may be powered by a mixture of gasoline and ethanol. Other mixtures are possible in which two types of liquid fuels are used, or a mixture of a liquid and a gaseous fuel is used, such as a mixture of gasoline and compressed natural gas (CNG). Injection timings determined for mixtures of liquid and gaseous fuels must account for differences in these fuels (e.g., density).

In some approaches, injection timings are calculated by an engine control unit in terms of a crank angle. More specifically, a crank angle corresponding to a start of fuel injection may be determined based on the revolution rate of the engine in which fuel injection is taking place in addition to its load.

The inventors herein have recognized an issue with such approaches. In particular, routines which calculate fuel injection timings based on engine revolution rate and engine load may be insufficient for injection of gaseous fuels or fuel mixtures including liquid and gaseous fuels, as such fuels may require a longer duration of injection. Other parameters which affect injection timing (e.g., physical dimensions of an ignition device, intake manifold, etc.) are further not accounted for.

Systems and methods for determining a start of fuel injection including a gaseous fuel in an internal combustion engine are provided.

In one example, an end of gas injection, a duration of gas injection, and a start of gas injection in an induction pipe of a cylinder of an internal combustion engine is determined based on one or more operating parameters. An earliest possible start of gas injection is further determined, and if the start of gas injection is before the earliest possible start of gas injection, at least one of the one or more operating parameters is modified such that the start of gas injection does not occur before the earliest possible start of gas injection.

In this way, fuel injection appropriate to fuel including at least one gaseous fuel is facilitated.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Some internal combustion engines utilize gaseous fuels to generate torque, or combinations of liquid and gaseous fuels (e.g., gasoline and compressed natural gas) as in flexible-fuel vehicles. In some approaches, injection timings are determined based on operating parameters of the internal combustion engine, such as engine revolution rate and engine load. Such routines, however, may be insufficient for appropriate injection of gaseous fuels, as longer injection periods are generally required. Moreover, such routines fail to account for other parameters which affect fuel injection, including physical characteristics of the engine such as the distance between a fuel injector and combustion chamber.

Figure 1:
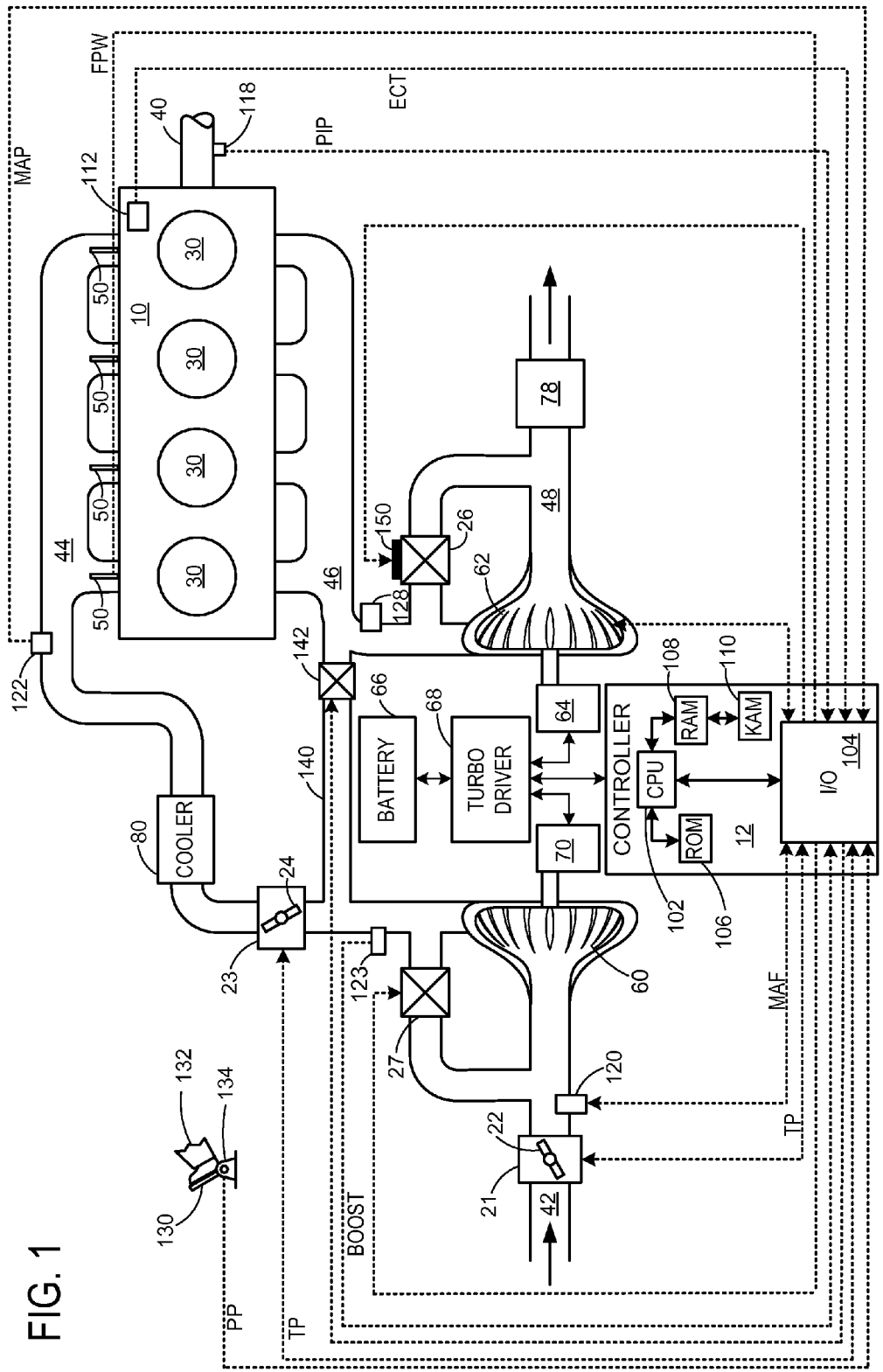
FIG. 1 shows a block diagram of a turbocharged engine.
Figure 2:
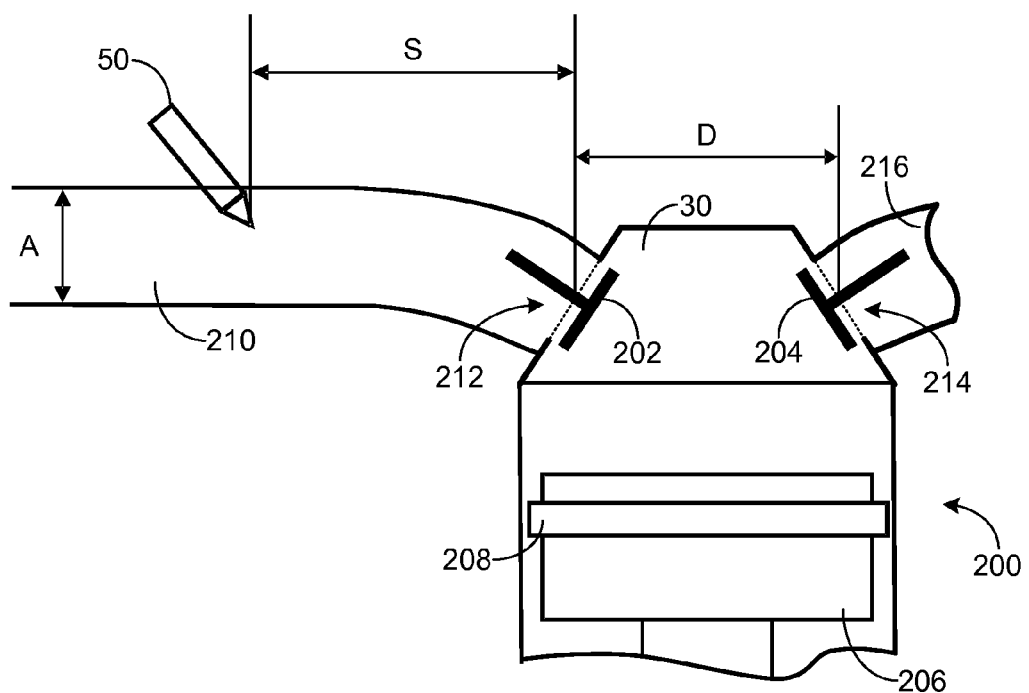
FIG. 2 schematically shows a partial view of a cylinder of the engine of FIG. 1.

Various systems and methods for determining a start of fuel injection including a gaseous fuel in an internal combustion engine are provided. In one embodiment, an end of gas injection, a duration of gas injection, and a start of gas injection in an induction pipe of a cylinder of an internal combustion engine is determined based on one or more operating parameters. An earliest possible start of gas injection is further determined, and if the start of gas injection is before the earliest possible start of gas injection, at least one of the one or more operating parameters is modified such that the start of gas injection does not occur before the earliest possible start of gas injection. FIG. 1 is a block diagram of a turbocharged engine. FIG. 2 schematically shows a partial view of a combustion chamber of the engine of FIG. 1. The engine of FIG. 1 also includes a controller configured to carry out the method depicted in FIG. 3.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown positioned upstream of each combustion chamber 30 in intake manifold 44 and configured to inject fuel into the intake port upstream of each combustion chamber in proportion to the pulse width of signal FPW received from controller 12 in what is known as a port injection configuration where the fuel injectors are port injectors. Fuel may be delivered to fuel injectors 50 by a fuel system (not shown) including a fuel tank, a fuel pump, and a fuel rail. In some embodiments, fuel injectors may alternatively or additionally be coupled directly to combustion chambers 30 for injecting fuel directly therein in a direct injection configuration. In this embodiment, the fuel injectors may be mounted in the side of the combustion chambers or in the top of the combustion chambers, for example.

Intake passage 42 may include throttles 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF (mass airflow) and MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which, for example, may be an electric actuator. In some embodiments, actuator 150 may be an electric motor. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning now to FIG. 2, a partial view of a cylinder 200 in engine 10 of FIG. 1 is shown. Cylinder 200 includes a combustion chamber 30, an intake valve 202, an exhaust valve 204, and a piston 206 having a piston seal 208. Combustion chamber 30 may receive an air-fuel mixture from an induction pipe 210 fluidically coupled to the combustion chamber. Induction pipe 210 may be a runner of an intake manifold (e.g., intake manifold 44 of FIG. 1), for example, and thus designated an intake conduit. The air-fuel mixture may include liquid fuel (e.g., gasoline), gaseous fuel (e.g., gaseous hydrogen, CNG, etc.), or a combination thereof injected from a fuel injector 50 configured to inject the air-fuel mixture into induction pipe 210 and upstream of the intake port of cylinder 200 in a port injection configuration. Thus, engine 10 may be operated with liquid fuels, gaseous fuels (e.g., gas-powered), or a combination thereof. A distance S separates the tip of fuel injector 50 and an inlet opening 212 of combustion chamber 30, where the inlet opening may be a region at which the side of intake valve 202 facing induction pipe 210 rests when the intake valve is fully closed. A second distance D separates inlet opening 212 from an exhaust opening 214 at which the side of exhaust valve 204 facing an exhaust pipe 216 rests when the exhaust valve is fully closed. A parameter A represents the cross-sectional area of induction pipe 210 in the depicted region—for example, in a region in substantial proximity to fuel injector 50 and the intake port of intake valve 202. In embodiments in which this region of induction pipe 210 is cylindrical, A may be the diameter of the induction pipe in this region. The parameters A, D, and S may be used as part of a method 300 to determine a start of fuel injection, described in further detail below with reference to FIG. 3. It will be appreciated that intake and exhaust valves 202 and 204 of cylinder 200, and the other cylinders of engine 10 shown in FIG. 1, may be controlled with a camshaft (not shown) configured to implement variable valve timing (VVT).

Figure 3:
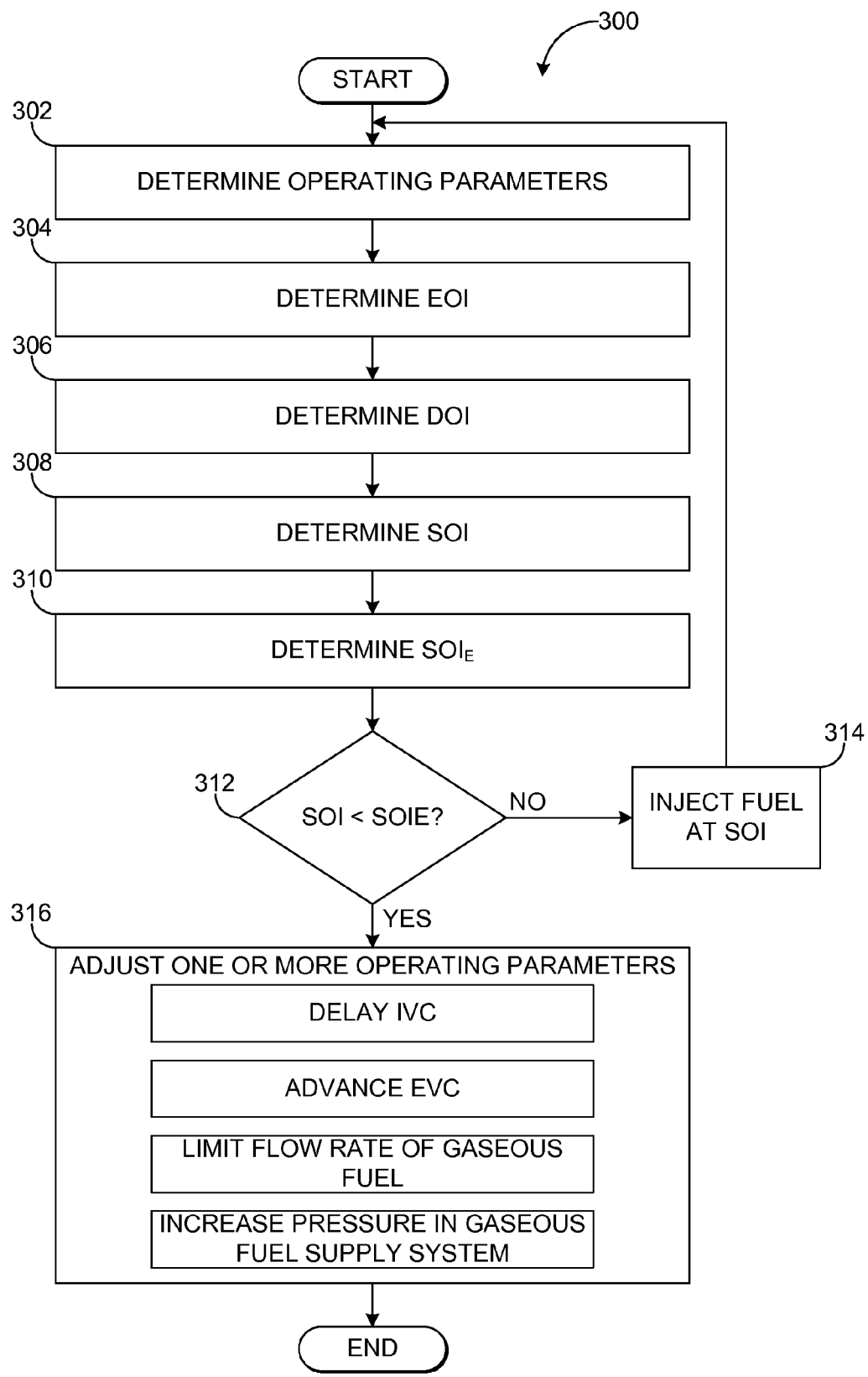
FIG. 3 shows a flow chart illustrating a method for determining a start of fuel injection in the engine of FIG. 1.

Turning now to FIG. 3, a method 300 is shown for determining a start of fuel injection (SOI) (e.g., timing, crank angle, etc.) at which fuel may be injected into each of combustion chambers 30 via fuel injectors 50 of engine 10 shown in FIGS. 1 and 2. Because method 300 accounts for an increased number of operating and predetermined parameters, the method may be particularly suitable for the injection of gaseous fuel (e.g., gaseous $H_2$) or a mixture of liquid and gaseous fuel (e.g., gasoline and CNG), as the injection of gaseous fuels generally requires increased injection durations to prevent unacceptable hydrocarbon release compared to the injection of liquid fuels.

At 302, a plurality of engine operating parameters (e.g., variables) is determined in order to determine SOI. The operating parameters may include an indication of the revolution rate of engine 10, which may be represented as an RPM value generated, for example, via the PIP signal produced by hall effect sensor 118, described above. The operating parameters may further include an indication of the density of the air-fuel mixture supplied to combustion chambers 30, which may be determined, for example, based on one or more of the MAP, FPW, and MAF signals described above. An indication of the mass flow rate (e.g., maximum flow rate in some embodiments) of fuel injected by fuel injectors 50 may determined, based also, for example, on the MAP, FPW, and MAF signals. An indication of the speed of the air-fuel mixture in induction pipe 210 may further be determined, based also, for example, on the MAP, FPW, and MAF signals. The operating parameters may further include an indication of the temperature of the air-fuel mixture in induction pipe 210, which may be determined in part, for example, based on ECT readings provided by temperature sensor 112 described above. Finally, the operating parameters may include an indication of the pressure in induction pipe 210, which may be based on one or more of the MAP, FPW, and MAF signals. It will be appreciated, however, that the operating parameters enumerated above may be determined based on other signals than those described above. Such signals may be outputted by other sensors than those shown and described above with reference to FIG. 1, or by such depicted sensors in locations other than those shown in FIG. 1. Moreover, one or more of the enumerated operating parameters may be determined at least in part based on another of the enumerated operating parameters. For example, the speed of the air-fuel mixture may be determined based in part on the previously-determined pressure in induction pipe 210 and the temperature of the air-fuel mixture therein. The operating parameters may yet further include predetermined parameters, such as A, S, various physical constants (e.g., the ideal gas constant R), and one or more of the dimensions of fuel injectors 50 (e.g., the length of the injectors through which fuel travels). These predetermined parameters may be stored in RAM 108 of controller 12 in FIG. 1, for example. One or more of the operating parameters described herein may also be determined using previously-formulated look-up tables also stored in RAM 108.

Next, at 304, an end of fuel injection (EOI) is determined, which may be represented by a crank angle of crankshaft 40 of engine 10 in FIG. 1, for example. EOI may be determined, for example, via the following relation: $EOI=IVC-\Delta\phi$, where IVC is the crank angle at which intake valve 202 of FIG. 2 is closed for a given rotation cycle. $\Delta\phi$ may be determined, for example, based on the following relation: $\Delta\phi=(2\pi n\rho AS/m)$, where n is the revolution rate of engine 10 described above, $\rho$ is the density of the air-fuel mixture supplied to combustion chambers 30 described above, A is the cross-sectional dimension (e.g., diameter) of induction pipe 210 described above, S is the distance between the tip of fuel injector 50 and inlet opening 212, and m is the mass flow rate of fuel injected by the injector. The relation may be alternatively expressed as $\Delta\phi=(2\pi n/v)$, where v=mRT/Ap and represents the speed of the air-fuel mixture in induction pipe 210, described above. In this simplified relation, R is the ideal gas constant (e.g., 8.314 J/K*mol), T is the temperature of the air-fuel mixture in induction pipe 210 described above, and p is the pressure in induction pipe 210 described above. It will be appreciated that p may vary based on n (engine revolution rate) and the load of engine 10 of FIG. 1.

Next, at 306, a duration of fuel injection (DOI) is determined. DOI may be determined based on one or more applicable operating parameters, such as m (fuel mass flow rate), p (pressure in induction pipe 210), and the one or more dimensions of fuel injectors 50 described above.

Next, at 308, an SOI is determined based on the EOI and DOI respectively determined at 304 and 306. The SOI may be determined, for example via the following relation: SOI=EOI−DOI, and may be computed by CPU 102 of controller 12 in FIG. 1. In alternative embodiments, SOI may be determined based on air humidity, one or more characteristics of the fuel (e.g., the methanol content of CNG when using CNG), a residual gaseous fuel content in the exhaust gas, the coolant temperature of the internal combustion engine (e.g., represented by the ECT signal from temperature sensor 112), the operating parameters of an exhaust gas recirculation system (e.g., pressure, temperature, and concentration of exhaust gas), the signal of a lambda sensor and/or the setting (e.g., switching state) of a switchable induction system. Furthermore, when determining the SOI, a surface roughness and/or geometry of induction tract 210 may be taken into account.

Next, at 310, an earliest possible start of injection ($SOI_E$) is determined. $SOI_E$ may be determined based on v (speed of the air-fuel mixture in induction pipe 210) and the speed of the gaseous fuel injected into the induction pipe via fuel injector 50, determined, for example, based on the MAP, FPW and MAF signals described above. The determination of $SOI_E$ may further take into account the geometry of cylinder 200 and induction pipe 210, utilizing for example the parameters A, D, and S.

Next, at 312, it is determined whether the SOI determined at 308 is less than the $SOI_E$ determined at 310. This check ensures that premature fuel injection and resulting unacceptable exhaustion of hydrocarbons does not occur, and that injection characteristics specific to gaseous fuels and liquid-gas fuel mixtures are accounted for. If the SOI is not less than the $SOI_E$ (NO), method 300 proceeds to 314 where fuel is injected via fuel injector 50 of FIGS. 1 and 2 according to the SOI determined at 308. Following fuel injection at 314, the method returns to 302. If the SOI is less than the $SOI_E$ (YES), method 300 proceeds to 316.

At 316, one or more operating parameters of engine 10 of FIG. 1 are adjusted to ensure suitable fuel injection. For example, the intake valve closing (IVC) of intake valve 202 of FIG. 2 may be delayed to occur at a later time. Alternatively or additionally, the exhaust valve closing (EVC) of exhaust valve 204 of FIG. 2 may be advanced—e.g., performed at an earlier time and corresponding smaller crank angle. Such modification of intake and exhaust valve closing times may be performed via a cam system operatively coupled to the valves and having variable valve timing capability. Further, the flow rate of gaseous fuel injection into induction pipe 210 by fuel injector 50 may be limited, for example by modifying the FWP signal sent to the fuel injectors of engine 10 of FIG. 1 described above. Still further, the pressure in the fuel supply system providing gaseous fuel may be increased. It will be appreciated that modification of one or more of the operating parameters at 316 may limit or reduce the load of engine 10, and that other actions may be performed to carry out load limitation or reduction—for example, enleaning the air-fuel mixture provided to combustion chambers 30, increasing exhaust gas recirculation rates, etc. Following modification of one or more operating parameters at 316, method 300 ends.

In this way, via execution of method 300, SOI, DOI, EOI, and $SOI_E$ may be determined in response to operating parameters to provide enhanced fuel injection and fuel injection appropriate to the characteristics of gaseous fuels (e.g., $H_2$, CNG). Optimized gaseous fuel injection may be enabled throughout an increased number of operating states as well.

Note that the example control and estimation methods included herein can be used with various engine and/or vehicle system configurations. The specific methods described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a gas-powered internal combustion engine, comprising:
   determining an end of gaseous fuel injection, a duration of gaseous fuel injection, and a start of gaseous fuel injection in an induction pipe of a cylinder of the internal combustion engine based on one or more operating parameters;
   determining an earliest possible start of gaseous fuel injection; and
   if the start of gaseous fuel injection is before the earliest possible start of gaseous fuel injection, increasing a pressure in a gaseous fuel supply system and limiting a maximum flow rate of the injected gaseous fuel such that the start of gaseous fuel injection does not occur before the earliest possible start of gaseous fuel injection.

2. The method of claim 1, wherein the end of gaseous fuel injection is determined based on an engine revolution rate, an air speed in the induction pipe, a flow rate of the injected gaseous fuel, and an intake valve closing.

3. The method of claim 2, wherein the air speed in the induction pipe is determined based on the engine revolution rate, a pressure in the induction pipe, a temperature of an air-fuel mixture, and the intake valve closing.

4. The method of claim 3, wherein the flow rate of the injected gaseous fuel is determined based on the pressure in the gaseous fuel supply system, the pressure in the induction pipe, and the air speed in the induction pipe.

5. The method of claim 4, wherein the duration of gaseous fuel injection is determined based on the flow rate of the gaseous fuel, the engine revolution rate, the pressure in the gaseous fuel supply system, and the pressure in the induction pipe.

6. The method of claim 1, wherein the start of gaseous fuel injection is determined based on one or more of an air humidity, one or more characteristics of the injected gaseous fuel, a residual gaseous fuel content in exhaust gas, a coolant temperature, a setting of an exhaust gas recirculation system, a signal of a lambda sensor, and a switching state of a switchable induction system.

7. The method of claim 1, wherein the earliest possible start of gaseous fuel injection is determined based on an air speed in the induction pipe and a flow rate of the injected gaseous fuel.

8. The method according of claim 1, further comprising, if the start of gaseous fuel injection is before the earliest possible start of gaseous fuel injection, closing an intake valve later, and closing an exhaust valve earlier, such that the start of gaseous fuel injection does not occur before the earliest possible start of gaseous fuel injection.

9. A method, comprising:
adjusting fuel injection start timing of a gaseous fuel to an engine based on engine speed n, an air-fuel mixture density $\pi$, an intake conduit cross-sectional area A, a distance S between a fuel injector and a cylinder intake valve, a mass flow rate of injected gaseous fuel m, and a pressure in an intake conduit; and
adjusting fuel injection end timing (EOI) to a crank angle determined via the relation $EOI=IVC-2\pi npAS/m$, where IVC is the crank angle at which the intake valve is closed for a given rotation cycle.

10. The method of claim 9, wherein adjusting the fuel injection start timing is further based on a speed and a temperature of an air-fuel mixture.

11. The method of claim 9, further comprising:
determining an earliest fuel injection start timing based on the engine speed, the air-fuel mixture density, the intake conduit cross-sectional area, the distance between the fuel injector and the intake valve, and the mass flow rate of injected gaseous fuel; and
if the fuel injection start timing is not before the earliest fuel injection start timing, injecting the gaseous fuel at the fuel injection start timing.

12. The method of claim 11, further comprising, if the fuel injection start timing is before the earliest fuel injection start timing, increasing a pressure in a supply system of the gaseous fuel.

13. An internal combustion engine, comprising:
a cylinder comprising a combustion chamber;
at least one fuel injector configured to inject at least a gaseous fuel from a supply system; and
a controller including instructions for:
determining a start of injection of the gaseous fuel based on a revolution rate of the internal combustion engine, a density of an air-fuel mixture, a cross-sectional area of an induction pipe, a distance between the fuel injector and an inlet opening of the combustion chamber, a mass flow rate of the gaseous fuel injected by the at least one fuel injector, a speed of the air-fuel mixture, a temperature of the air-fuel mixture, and a pressure in the induction pipe;
determining an earliest start of injection of the gaseous fuel based on a geometry of the cylinder and a geometry of the induction pipe; and
if the start of injection of the gaseous fuel is before the earliest start of injection of the gaseous fuel, limiting the mass flow rate of the gaseous fuel and increasing a pressure in the supply system of the gaseous fuel.

14. The internal combustion engine of claim 13, wherein the at least one fuel injector is a port injector.

15. The internal combustion engine of claim 13, wherein the controller further includes instructions for:
determining a duration of injection of at least the gaseous fuel based on one or more variables;
determining an end of injection of at least the gaseous fuel based on the one or more variables; and
if the start of injection of the gaseous fuel is before the earliest start of injection of at least the gaseous fuel, delaying a closing of an intake valve and/or advancing a closing of an exhaust valve.

16. The method of claim 1, wherein the determination of the start of gaseous fuel injection is based on a surface roughness and a geometry of the induction pipe, and wherein the determination of the earliest possible start of gaseous fuel injection is further based on a geometry of the cylinder and the geometry of the induction pipe.

17. The method of claim 5, wherein the determination of the duration of gaseous fuel injection is further based on one or more dimensions of fuel injectors performing the gaseous fuel injection.

18. The method of claim 11, further comprising, if the fuel injection start timing is before the earliest fuel injection start timing, limiting a maximum flow rate of the injected gaseous fuel, closing the intake valve later, and closing an exhaust valve earlier, such that the fuel injection start timing does not occur before the earliest fuel injection start timing.

* * * * *